US012638803B2

(12) United States Patent
Ishida et al.

(10) Patent No.: US 12,638,803 B2

(45) Date of Patent: May 26, 2026

(54) IMAGE FORMING APPARATUS

(71) Applicant: KYOCERA Document Solutions Inc., Osaka (JP)

(72) Inventors: Keiju Ishida, Osaka (JP); Takehiro Sato, Osaka (JP); Sachio Izumichi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/990,089

(22) Filed: Dec. 20, 2024

(65) Prior Publication Data

US 2025/0208561 A1 Jun. 26, 2025

(30) Foreign Application Priority Data

Dec. 25, 2023 (JP) ................................ 2023-217705

(51) Int. Cl.

*G03G 21/16* (2006.01)
*G03G 15/00* (2006.01)
*G03G 15/20* (2006.01)

(52) U.S. Cl.

CPC ..... *G03G 21/1633* (2013.01); *G03G 15/2064* (2013.01); *G03G 15/6579* (2013.01); *G03G 15/80* (2013.01); *G03G 21/1619* (2013.01); *G03G 21/1647* (2013.01); *G03G 21/1652* (2013.01)

(58) Field of Classification Search

None

See application file for complete search history.

(56) References Cited

U.S. PATENT DOCUMENTS

| | | | | |
|---|---|---|---|---|
| 5,179,415 | A * | 1/1993 | Ikematsu | G03G 15/2035 399/331 |
| 5,305,065 | A * | 4/1994 | Hoover | G03G 21/1685 399/114 |
| 2008/0240772 | A1* | 10/2008 | Nishikawa | G03G 15/0894 399/106 |
| 2009/0022516 | A1* | 1/2009 | Ohta | G03G 21/1628 399/126 |
| 2012/0027462 | A1* | 2/2012 | Nozawa | G03G 15/2017 399/122 |
| 2013/0142526 | A1 | 6/2013 | Numazu et al. | |

(Continued)

FOREIGN PATENT DOCUMENTS

JP 2021086093 A 6/2021

OTHER PUBLICATIONS

European Patent Office, Extended European Search Report Issued in Application No. 24222347.7, May 28, 2025, 10 pages.

*Primary Examiner* — Sevan A Aydin

(74) *Attorney, Agent, or Firm* — Alleman Hall LLP

(57) ABSTRACT

A main body includes a first opening and a second opening. A first cover member is capable of opening and closing the first opening. A second cover member is capable of opening and closing the second opening. At least a part of a fixing device can be drawn out from the main body via the second opening. A latch mechanism latches the second cover member at a closing position. A release mechanism is arranged at a position that can be accessed from the first opening in the main body and releases the latch of the second cover member by the latch mechanism upon receiving an external force.

5 Claims, 8 Drawing Sheets

(56) References Cited

U.S. PATENT DOCUMENTS

| | | | | |
|---|---|---|---|---|
| 2014/0348542 | A1* | 11/2014 | Yoshida | G03G 21/1685<br>399/122 |
| 2015/0277373 | A1* | 10/2015 | Yamaguchi | B01D 46/10<br>55/495 |
| 2019/0265636 | A1* | 8/2019 | Teshima | G03G 21/1676 |
| 2020/0217369 | A1* | 7/2020 | Hiura | F16B 21/186 |
| 2021/0165352 | A1 | 6/2021 | Sato | |
| 2022/0187746 | A1 | 6/2022 | Koyama | |
| 2022/0256049 | A1 | 8/2022 | Ono | |
| 2023/0195013 | A1* | 6/2023 | Izumichi | G03G 15/2017 |
| 2023/0400793 | A1* | 12/2023 | Nguyen | G03G 15/0875 |
| 2024/0111243 | A1* | 4/2024 | Uehara | G03G 21/206 |
| 2024/0118654 | A1* | 4/2024 | Kuwabara | G03G 21/1638 |
| 2024/0171690 | A1* | 5/2024 | Kaneda | H04N 1/00519 |
| 2024/0385566 | A1* | 11/2024 | Nakata | G03G 21/1633 |

* cited by examiner

IMAGE FORMING APPARATUS

INCORPORATION BY REFERENCE

This application is based upon and claims the benefit of priority from the corresponding Japanese Patent Application No. 2023-217705 filed on Dec. 25, 2023, the entire contents of which are incorporated herein by reference.

BACKGROUND

The present disclosure relates to an image forming apparatus including a fixing device, at least a part of which can be drawn out from a main body.

An image forming apparatus that uses electrophotography fixes a toner image onto a sheet using a fixing device.

The fixing device may be sectioned into a fixing unit which includes a fixing member and a pressure roller and a heating unit which includes a heater for heating the fixing member.

Further, the image forming apparatus is known to include a mechanism for moving the heating unit from a heating position to an evacuation position in an interlocking manner with an operation with respect to an operation member. The fixing unit can be drawn out from the main body while the heating unit is evacuated to the evacuation position.

SUMMARY

An image forming apparatus according to an aspect of the present disclosure includes a main body, a sheet conveying path, a first cover member, a second cover member, a fixing device, a latch mechanism, and a release mechanism. The main body includes a first opening and a second opening formed in a direction different from that of the first opening. The sheet conveying path is arranged in the main body and passes through a specific position inside the first opening. The first cover member is capable of opening and closing the first opening and is opened to thus open a part of the sheet conveying path. The second cover member is capable of opening and closing the second opening. The fixing device is arranged at the specific position in the main body, includes a heater and a fixing member which is heated by the heater and also heats a toner image formed on a sheet that passes through the specific position, and at least a part of which can be drawn out from the main body via the second opening. The latch mechanism latches the second cover member at a closing position. The release mechanism is arranged at a position that can be accessed from the first opening in the main body and releases the latch of the second cover member by the latch mechanism upon receiving an external force.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the attached drawings. It is noted that the following embodiment is an example of embodying the present disclosure and does not limit the technical scope of the present disclosure.

[Configuration of Image Forming Apparatus 10]

An image forming apparatus 10 according to the embodiment executes print processing using electrophotography. The print processing is processing of forming an image on a sheet.

Figure 1:
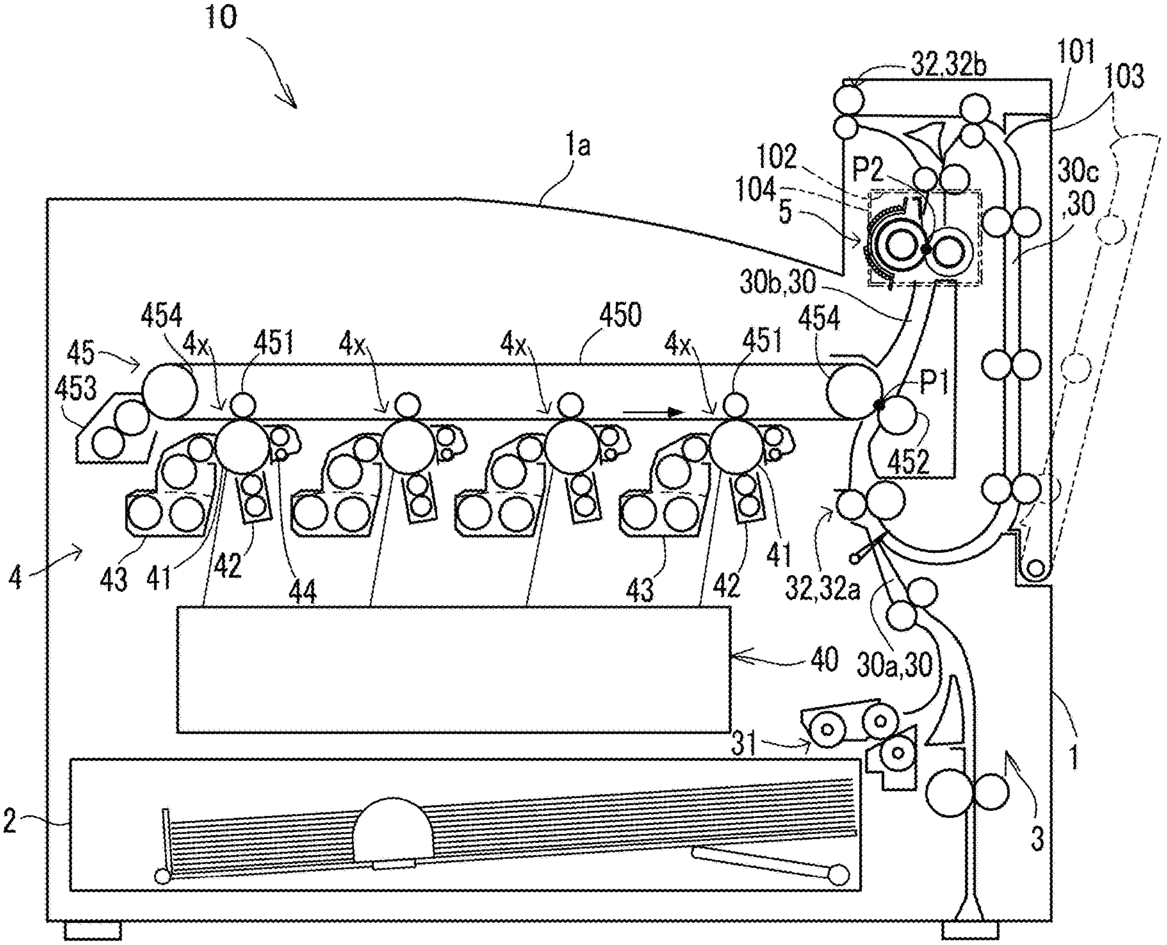
FIG. 1 is a configuration diagram of an image forming apparatus according to an embodiment.

As shown in FIG. 1, the image forming apparatus 10 includes a sheet storing portion 2, a sheet conveying path 30, a sheet conveying device 3, and a printing device 4. The sheet conveying device 3 and the printing device 4 are housed in a main body 1 as a housing. The main body 1 includes a main body frame 1*x* that constitutes a framework of the main body 1 and an exterior member attached to the main body frame 1*x*.

The sheet storing portion 2 is capable of storing the sheets. The sheet conveying path 30 is a path of the sheets that is arranged inside the main body 1. The sheet conveying device 3 includes a sheet feed device 31 and a plurality of conveying roller pairs 32.

The sheet feed device 31 feeds the sheets stored in the sheet storing portion 2 one by one to the sheet conveying path 30. The sheet conveying path 30 is arranged along a path that passes through a transfer position P1 and a fixing position P2 in the main body 1.

The plurality of conveying roller pairs 32 convey the sheet along the sheet conveying path 30. The plurality of conveying roller pairs 32 include a registration roller pair 32*a* and a discharge roller pair 32*b*.

The registration roller pair 32*a* temporarily stops the conveyance of the sheet and adjusts a timing at which the sheet is to be fed to the transfer position P1. The discharge roller pair 32*b* discharges the sheet on which an image has been formed onto a discharge tray 1*a* from the sheet conveying path 30.

The sheet conveying path 30 includes a first conveying path 30*a*, a second conveying path 30*b*, and a third conveying path 30*c* (see FIG. 1).

The first conveying path 30*a* is a path that is provided from a position of the sheet feed device 31 to a position before the registration roller pair 32*a*.

The second conveying path 30*b* is a path that is continuous with the first conveying path 30*a* and includes a position of the registration roller pair 32*a*, the transfer position P1, the fixing position P2, and a position of the discharge roller pair 32*b*.

The third conveying path 30*c* is a path that branches from a portion between the fixing position P2 and the position of the discharge roller pair 32*b* on the second conveying path 30*b* and joins the second conveying path 30*b* at a connection portion with the first conveying path 30*a*.

The third conveying path 30*c* is a path of the sheet that is conveyed by being inverted after passing through the fixing position P2. The third conveying path 30*c* is a so-called inverse conveying path. When conveyed along the third conveying path 30*c*, the sheet is conveyed along the second conveying path 30*b* again in a state where the front, back, top, and bottom thereof are inverted.

The printing device 4 executes the print processing on the sheet conveyed along the second conveying path 30*b*. An image to be formed on the sheet is a toner image.

The printing device 4 includes a laser scanning unit 40, one or more image forming portions 4*x*, a transfer device 45, and a fixing device 5. The image forming portion 4*x* includes a photoconductor 41, a charging device 42, a developing device 43, and a drum cleaning device 44.

The charging device 42 charges a surface of the photoconductor 41. The laser scanning unit 40 scans beam light on the charged surface of the photoconductor 41. Thus, the laser scanning unit 40 forms an electrostatic latent image on the surface of the photoconductor 41.

The developing device 43 develops the electrostatic latent image formed on the surface of the photoconductor 41 into a toner image. The transfer device 45 transfers the toner image formed on the surface of the photoconductor 41 onto the sheet.

In the present embodiment, the printing device 4 is a tandem-type color printing device including a plurality of image forming portions 4*x*. Further, the transfer device 45 includes an intermediate transfer belt 450, a plurality of primary transfer devices 451, a secondary transfer device 452, and a belt cleaning device 453.

In the example shown in FIG. 1, the printing device 4 includes four image forming portions 4*x* respectively corresponding to toner of four colors, that is, yellow, magenta, cyan, and black. The transfer device 45 includes four primary transfer devices 451 respectively corresponding to the four image forming portions 4*x*.

The intermediate transfer belt 450 is rotatably supported by a plurality of supporting rollers 454. One of the plurality of supporting rollers 454 rotates by being driven by a belt drive device (not shown). Thus, the intermediate transfer belt 450 rotates.

Each of the primary transfer devices 451 transfers the toner image formed on the surface of the photoconductor 41 in the corresponding one of the image forming portions 4*x* onto a surface of the intermediate transfer belt 450. Thus, a synthetic toner image obtained by synthesizing the toner images of four colors is formed on the surface of the intermediate transfer belt 450.

The intermediate transfer belt 450 rotates while carrying the synthetic toner image. The secondary transfer device 452 transfers the synthetic toner image formed on the surface of the intermediate transfer belt 450 onto the sheet at the transfer position P1.

The drum cleaning device 44 removes waste toner from the surface of the photoconductor 41. The belt cleaning device 453 removes waste toner from the surface of the intermediate transfer belt 450.

The fixing device 5 is arranged at the fixing position P2 on the sheet conveying path 30. The fixing position P2 is a specific position inside a first opening 101. The fixing position P2 is a position on a downstream side of the transfer position P1 in a sheet conveying direction.

The fixing device 5 heats and pressurizes the synthetic toner image formed on the sheet at the fixing position P2. Thus, the fixing device 5 fixes the synthetic toner image onto the sheet.

Figure 2:
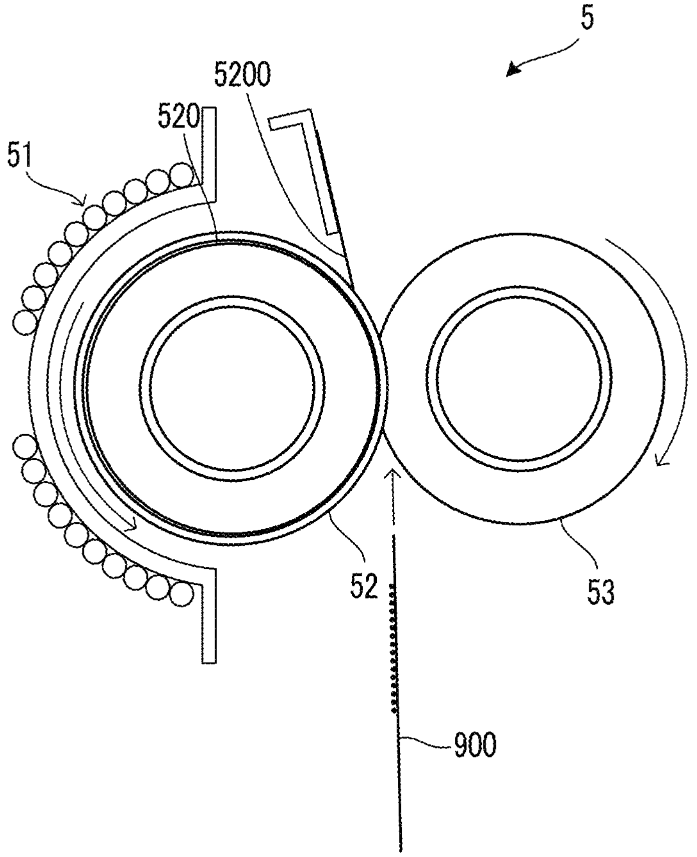
FIG. 2 is a diagram showing a partial configuration of a fixing device in the image forming apparatus according to the embodiment.

As shown in FIG. 2, the fixing device 5 includes a heater 51, a fixing belt 52, a fixing roller 520, a pressure roller 53, and a sheet separation member 5200.

The fixing belt 52 is a flexible cylindrical member including the fixing roller 520 therein. The fixing belt 52 is heated by the heater 51 and also heats the toner image formed on the sheet that passes through the fixing position P2.

The fixing roller 520 is a cylindrical member which supports the fixing belt 52 from an inner side of the fixing belt 52. The fixing roller 520 is supported rotatably. The fixing belt 52 is capable of rotating with the fixing roller 520.

The fixing belt 52 includes a conductive base material, an elastic layer formed on an outer circumference of the base material, and a release layer formed on an outer circumference of the elastic layer.

The heater 51 is arranged so as to oppose an outer circumferential surface of the fixing belt 52. In the present embodiment, the heater 51 is a heating device that uses an induction heating system. The heater 51 mainly heats the base material of the fixing belt 52 by electromagnetic induction.

The pressure roller 53 is supported rotatably. The pressure roller 53 rotates by being driven by a drive device (not shown). The fixing belt 52 and the fixing roller 520 rotate in conjunction with the pressure roller 53.

The fixing belt 52 heats the toner image formed on the sheet. The pressure roller 53 biases the sheet toward the fixing belt 52 to thus pressurize the toner image toward the sheet.

It is noted that the fixing belt 52 is an example of a fixing member that is heated by the heater 51. The pressure roller 53 is an example of a pressure member that biases the sheet toward the fixing belt 52.

The sheet separation member 5200 peels the sheet 900 off from the fixing belt 52 when the sheet adheres onto the fixing belt 52.

When the print processing is executed on one side of the sheet, the sheet conveying device 3 executes first conveyance processing, second conveyance processing, and discharge processing. The first conveyance processing is processing of conveying the sheet stored in the sheet storing portion 2 along the first conveying path 30*a*. The second conveyance processing is processing of conveying the sheet along the second conveying path 30*b*. The discharge processing is processing of discharging the sheet onto the discharge tray 1*a* from the second conveying path 30*b*.

When the print processing is executed on both sides of the sheet, the sheet conveying device 3 first executes the first conveyance processing, the second conveyance processing, and third conveyance processing and then executes the second conveyance processing and the discharge processing. The third conveyance processing is processing of inverting the sheet on the second conveying path 30*b* and further conveying the sheet along the third conveying path 30*c*.

Figure 4:
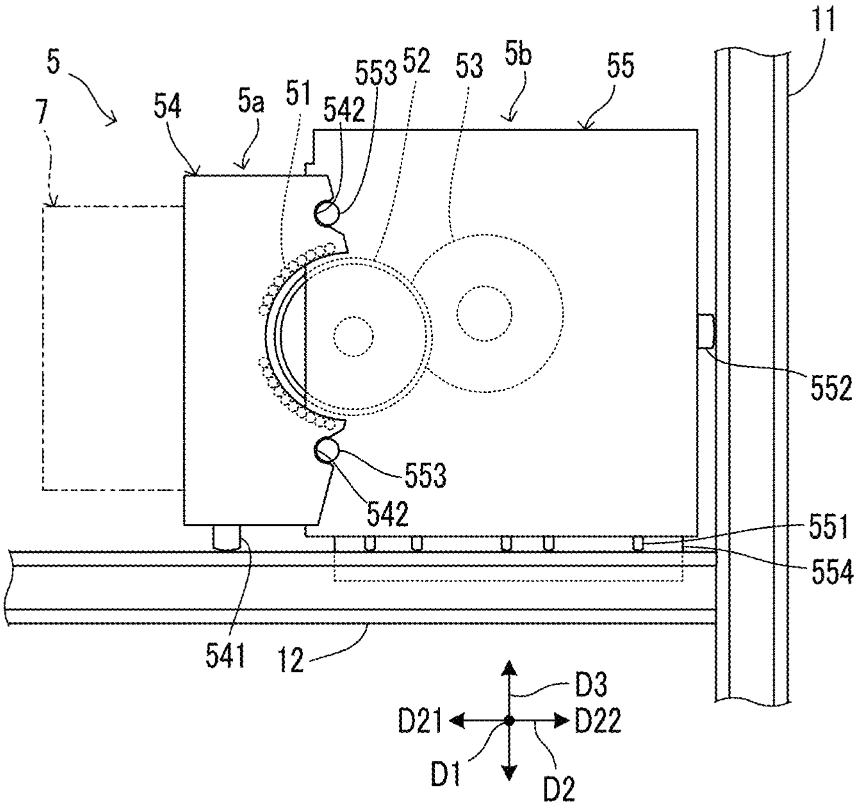
FIG. 4 is a front view of the fixing device in a vicinity state in the image forming apparatus according to the embodiment.
Figure 5:
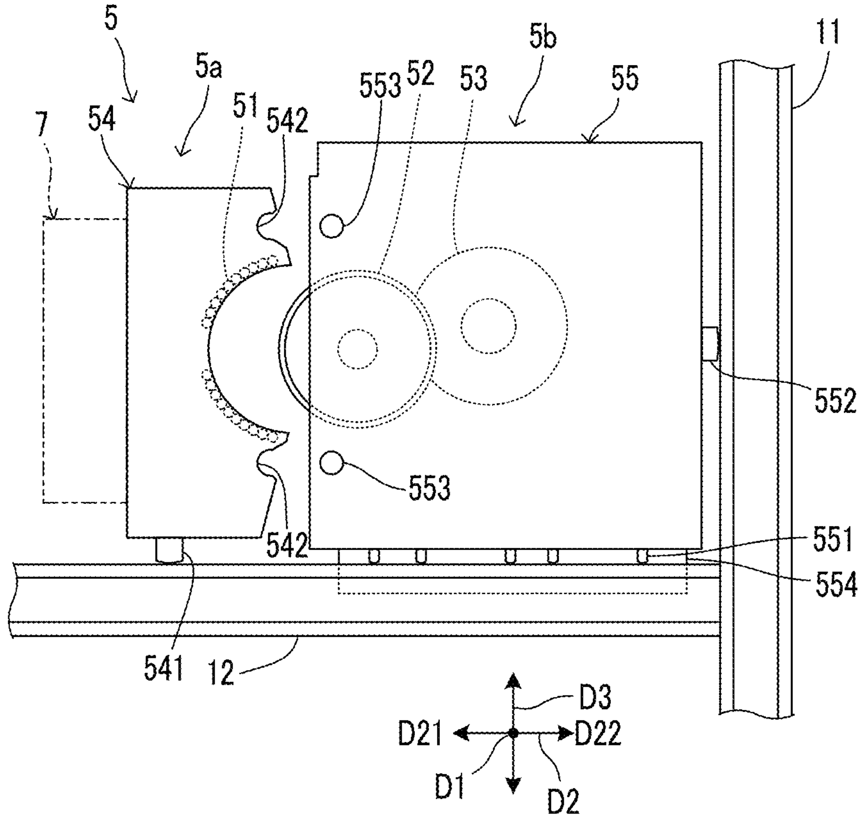
FIG. 5 is a front view of the fixing device in a spaced state in the image forming apparatus according to the embodiment.

In the present embodiment, the fixing device 5 is sectioned into a heating unit 5*a* and a fixing unit 5*b* (see FIG. 4 and FIG. 5). The heating unit 5*a* is arranged along a first direction D1 in the main body 1. The fixing unit 5*b* is also arranged along the first direction D1 in the main body 1.

In other words, the heating unit 5*a* and the fixing unit 5*b* are arranged in a state where longitudinal directions thereof are provided along the first direction D1.

The heating unit 5*a* and the fixing unit 5*b* are arranged next to each other in a second direction D2. In other words, the second direction D2 is an array direction of the heating unit 5*a* and the fixing unit 5*b*. The second direction D2 is a direction that intersects with the first direction D1.

In descriptions below, one side of the second direction D2 will be referred to as a first side D21, and the other side of the second direction D2 will be referred to as a second side D22 (see FIG. 3 to FIG. 5, FIG. 7, and FIG. 8). The heating unit 5*a* is arranged on the first side D21 with respect to the fixing unit 5*b* (see FIG. 4, FIG. 5, FIG. 7, and FIG. 8).

The heating unit 5*a* includes the heater 51 and a first supporting member 54. The fixing unit 5*b* includes the fixing belt 52, the fixing roller 520, the pressure roller 53, and a second supporting member 55.

The first supporting member 54 is a member which supports the heater 51. The second supporting member 55 is a member which supports the fixing belt 52, the fixing roller 520, and the pressure roller 53. The fixing belt 52 is supported by the second supporting member 55 via the fixing roller 520.

Figure 3:
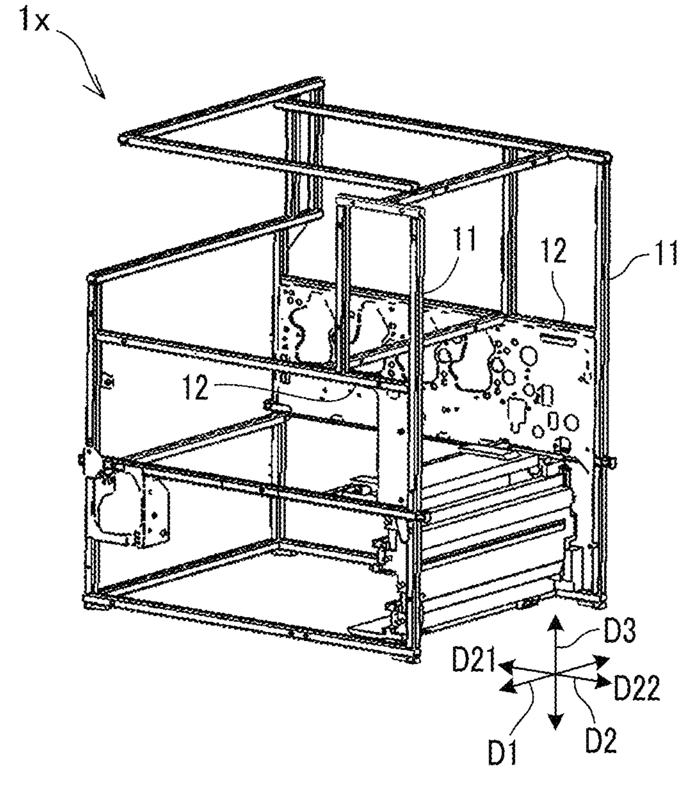
FIG. 3 is a perspective view of a main body frame in the image forming apparatus according to the embodiment.

The main body frame 1*x* is configured by a combination of a plurality of metal pipes (see FIG. 3). The heating unit 5*a* and the fixing unit 5*b* are supported by the main body frame 1*x*. The fixing unit 5*b* is arranged on the second side D22 of the second direction D2 with respect to the heating unit Sa.

The plurality of metal pipes configuring the main body frame 1*x* include restriction portions 11 and lower supporting portions 12 (see FIG. 3 to FIG. 5).

In the present embodiment, the restriction portions 11 are two supporting column pipes that are formed to extend in a longitudinal direction D3 and are arranged while being spaced apart from each other in the first direction D1 (see FIG. 3). The longitudinal direction D3 is an up-down direction.

The lower supporting portions 12 are two beam pipes that are formed to extend in the second direction D2 below the heating unit 5*a* and the fixing unit 5*b* and are arranged while being spaced apart from each other in the first direction D1 (see FIG. 3).

Figure 7:
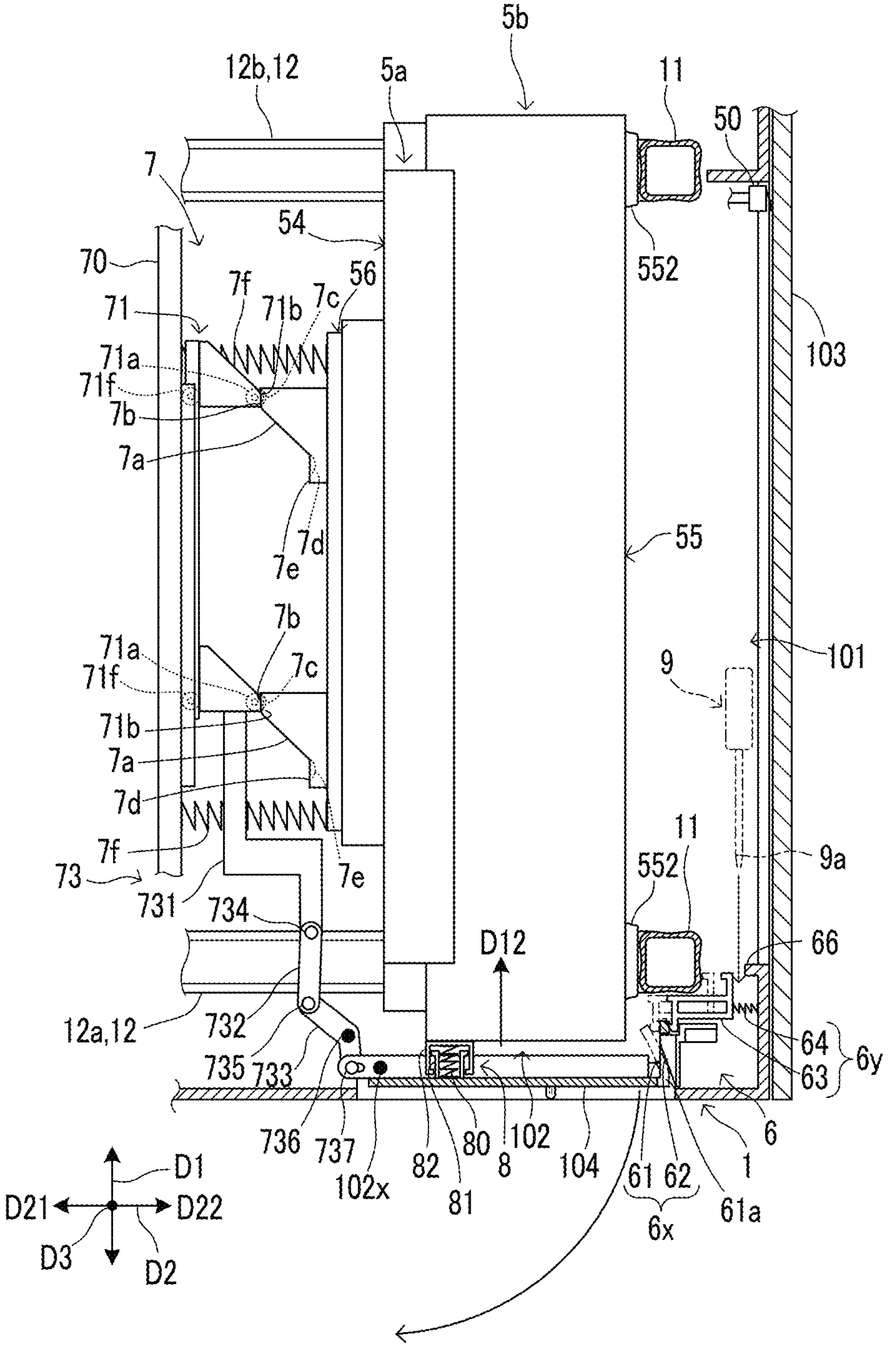
FIG. 7 is a plan view of an interlocking mechanism in a biased state and a latch/release mechanism in a latched state in the image forming apparatus according to the embodiment.
Figure 8:
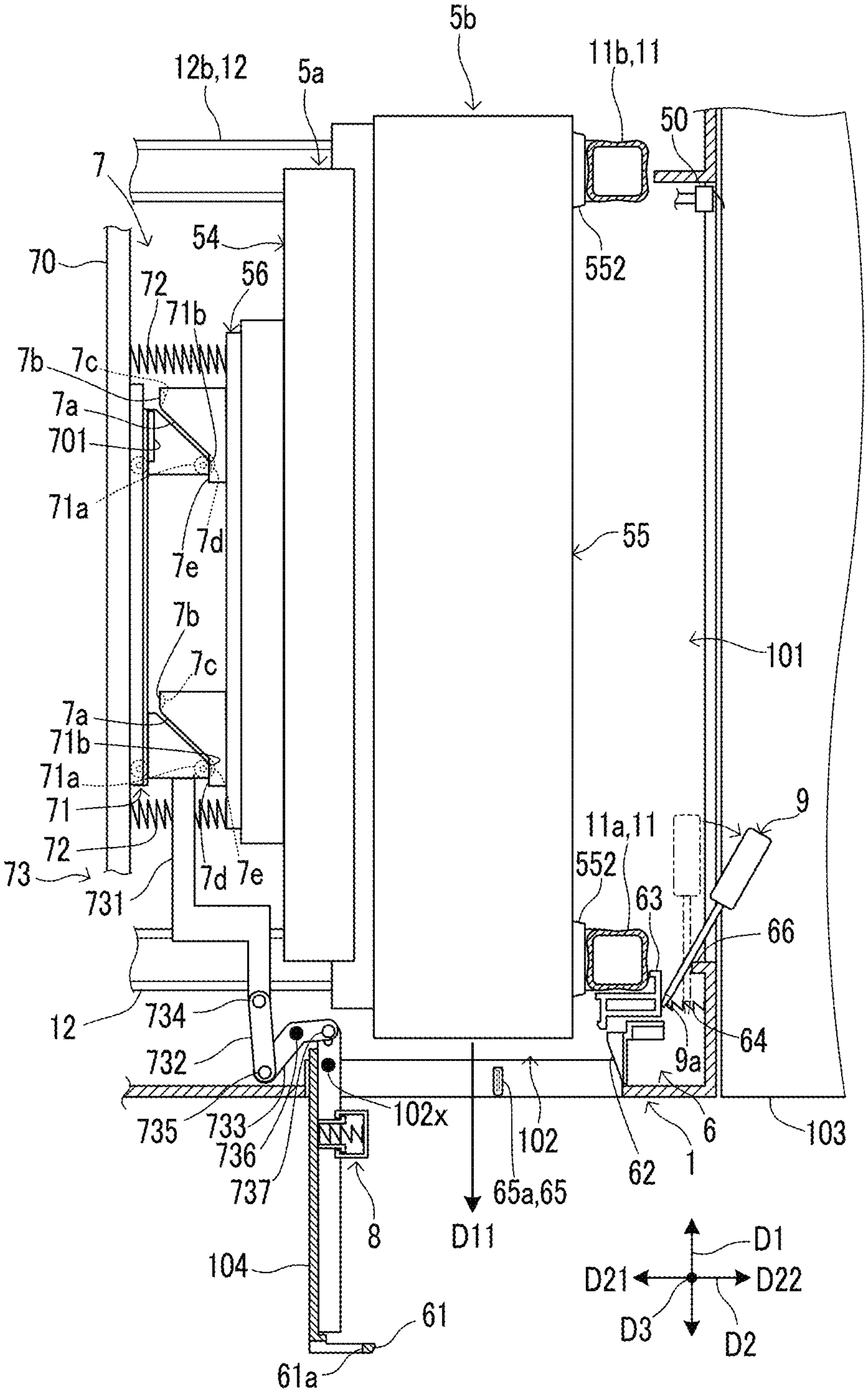
FIG. 8 is a plan view of the interlocking mechanism in a pulling state and the latch/release mechanism in a released state in the image forming apparatus according to the embodiment.

The heating unit 5*a* and the fixing unit 5*b* are mounted on the lower supporting portions 12 in a state where longitudinal directions thereof are provided along the first direction D1 (see FIG. 7 and FIG. 8). In other words, the lower supporting portions 12 support the heating unit 5*a* and the fixing unit 5*b* from below.

The heating unit 5*a* and the fixing unit 5*b* are movable on the lower supporting portions 12 along the second direction D2. The fixing unit 5*b* is arranged between the heating unit 5*a* and the restriction portions 11 (see FIG. 4 and FIG. 5).

By the heating unit 5*a* being moved to a position apart from the fixing unit 5*b*, the fixing unit 5*b* can be drawn out from the main body 1 along the first direction D1 (see FIG. 5 and FIG. 8).

The main body 1 includes the first opening 101 and a second opening 102 formed in a direction different from that of the first opening 101 (see FIG. 1, FIG. 7, and FIG. 8).

For example, the first opening 101 is formed on one of both side surfaces of the main body 1, and the second opening 102 is formed on one of a front surface and a back surface of the main body 1. Alternatively, the first opening 101 is formed on one of the front surface and the back surface of the main body 1, and the second opening 102 is formed on one of the both side surfaces of the main body 1.

In the present embodiment, the first opening 101 is formed on a side surface of the main body 1 on the second side D22 of the second direction D2, and the second opening 102 is formed on the front surface of the main body 1 (see FIG. 1).

The image forming apparatus 10 includes a first cover member 103 that is capable of opening and closing the first opening 101 and a second cover member 104 that is capable of opening and closing the second opening 102 (see FIG. 1).

By being opened, the first cover member 103 opens a part of the sheet conveying path 30 to the outside of the main body 1. In the present embodiment, the first cover member 103 is opened to thus open the third conveying path 30*c* to the outside of the main body 1 (see FIG. 1).

By being opened, the second cover member 104 opens one end of at least a part of the fixing device 5 in the first direction D1 to the outside of the main body 1. In the present embodiment, the second cover member 104 is opened to thus open one end of the fixing unit 5*b* in the first direction D1 to the outside of the main body 1 (see FIG. 8).

Incidentally, the temperature of the fixing device 5 becomes high. Therefore, it is desirable to be able to prevent the user from carelessly drawing out a part or all of the fixing device 5 from the main body 1.

The image forming apparatus 10 has a configuration for preventing the user from carelessly drawing out the fixing unit 5*b* from the main body 1. Hereinafter, the configuration related to the attachment and detachment of the fixing unit 5*b* in the image forming apparatus 10 will be described.

The second cover member 104 is supported by a first supporting shaft 102*x* (see FIG. 7 and FIG. 8). Thus, the second cover member 104 is rotatable about the first supporting shaft 102*x*. The second cover member 104 is movable between a closing position at which the second opening 102 is closed and an opening position at which the second opening 102 is opened.

FIG. 7 shows the second cover member 104 positioned at the closing position and the fixing device 5. FIG. 8 shows the second cover member 104 positioned at the opening position and the fixing device 5.

The image forming apparatus 10 further includes an interlocking mechanism 7 and a latch/release mechanism 6 (see FIG. 7 and FIG. 8). The latch/release mechanism 6 includes a latch mechanism 6*x* and a release mechanism 6*y*.

The interlocking mechanism 7 is a mechanism for causing the heating unit 5*a* to approach the fixing unit 5*b* or be spaced apart from the fixing unit 5*b* in an interlocking manner with a closing operation or opening operation of the second cover member 104.

The latch mechanism 6*x* latches the second cover member 104 to retain the second cover member 104 at the closing position (see FIG. 7). The release mechanism 6*y* releases the latch of the second cover member 104 by the latch mechanism 6*x* (see FIG. 8). By releasing the latch of the second cover member 104, the second cover member 104 can rotate from the closing position to the opening position.

When the second cover member 104 is positioned at the opening position, the fixing unit 5*b* can be drawn out from the main body 1 via the second opening 102 (see FIG. 8).

[Configuration of Interlocking Mechanism 7]

The interlocking mechanism 7 moves in an interlocking manner with the second cover member 104. By being operated, the second cover member 104 can move in a closing direction or an opening direction.

The closing direction is a movement direction of the second cover member 104 when closing the second cover member 104. The opening direction is a movement direction of the second cover member 104 when opening the second cover member 104.

The interlocking mechanism 7 causes the heating unit 5*a* to move along the second direction D2 in an interlocking manner with the movement of the second cover member 104.

The interlocking mechanism 7 causes the heating unit 5*a* to move toward the second side D22 in an interlocking manner with the movement of the second cover member 104 in the closing direction (see FIG. 7). On the other hand, the interlocking mechanism 7 causes the heating unit 5*a* to move toward the first side D21 in an interlocking manner with the movement of the second cover member 104 in the opening direction (see FIG. 8).

The interlocking mechanism 7 includes a coupling member 56, a guide member 70, a movable member 71, bias members 72, and a first direction movement mechanism 73. The coupling member 56 is coupled to the first supporting member 54 of the heating unit 5*a*. The coupling member 56 configures a part of the heating unit 5*a*.

The bias members 72 bias the heating unit 5*a* toward the first side D21. Specifically, the bias members 72 are one or more elastic members that bias the heating unit 5*a* toward the first side D21. For example, the elastic member is a coil spring, a leaf spring, or the like.

In the examples shown in FIG. 7 and FIG. 8, the bias members 72 are two tension springs that elastically bias the heating unit 5*a* toward the first side D21.

The coupling member 56 includes tilted surfaces 7*a*. The tilted surfaces 7*a* are provided in the heating unit 5*a* while facing the first side D21. The tilted surfaces 7*a* are surfaces that are tilted from the second side D22 toward the first side D21 with respect to the first direction D1. In the present embodiment, the tilted surfaces 7*a* are provided at two positions spaced apart from each other in the first direction D1 (see FIG. 7 and FIG. 8).

The movable member 71 is supported while being movable along the first direction D1. The guide member 70 guides the movable member 71 along the first direction D1. For example, the guide member 70 is supported by the main body frame 1*x*.

Figure 9:
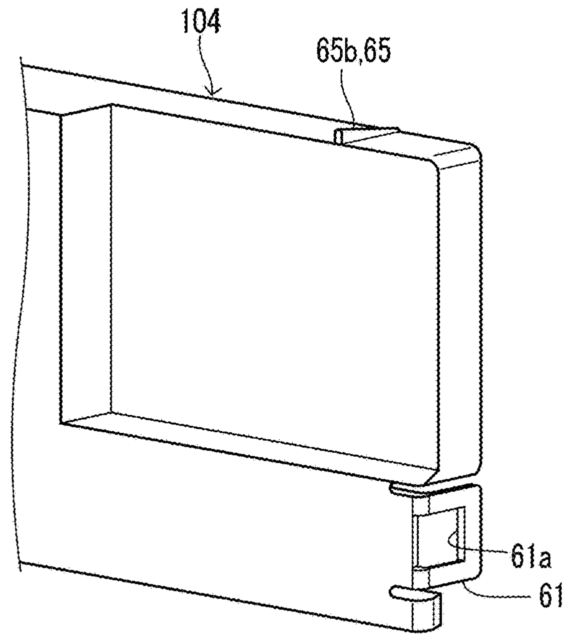
FIG. 9 is a perspective view of a part of a second cover member and an elastic latch portion in the image forming apparatus according to the embodiment.

The movable member 71 includes one or more rollers 71*a* that are supported rotatably (see FIG. 7 to FIG. 9). The rollers 71*a* are provided at positions respectively corresponding to the tilted surfaces 7*a* in the movable member 71. In the present embodiment, the rollers 71*a* are provided at two positions spaced apart from each other in the first direction D1 (see FIG. 7 to FIG. 9). The rollers 71*a* roll while being in contact with the tilted surfaces 7*a*.

The first direction movement mechanism 73 causes the movable member 71 to move along the first direction D1 in an interlocking manner with the movement of the second cover member 104. In the present embodiment, the first direction movement mechanism 73 is a link mechanism which converts the rotation of the second cover member 104 into a linear operation along the first direction D1.

The first direction movement mechanism 73 includes a first link member 731, a second link member 732, and a third link member 733 (see FIG. 7 and FIG. 8).

One end of the first link member 731 is connected to the movable member 71, and the other end of the first link member 731 is coupled to one end of the second link member 732 by a first coupling shaft 734. The other end of the second link member 732 is connected to one end of the third link member 733 by a second coupling shaft 735. The other end of the third link member 733 is coupled to one end of the second cover member 104 by a third coupling shaft 737.

The third link member 733 is rotatably supported by a second supporting shaft 736.

In the present embodiment, when moving the second cover member 104 from the opening position to the closing position, the first direction movement mechanism 73 causes the movable member 71 to move toward a rear side along the first direction D1. Moreover, when moving the second cover member 104 from the closing position to the opening position, the first direction movement mechanism 73 causes the movable member 71 to move toward a front side along the first direction D1.

As described above, the movement direction from the opening position to the closing position is the closing direction. The movement direction from the closing position to the opening position is the opening direction.

In descriptions below, an end portion of the tilted surface 7*a* on the second side D22 will be referred to as a base end portion of the tilted surface 7*a*, and an end portion of the tilted surface 7*a* on the first side D21 will be referred to as a terminal portion of the tilted surface 7*a*. The base end portion is an example of a portion of the tilted surface 7*a* on the second side D22. The terminal portion is an example of a portion of the tilted surface 7*a* on the first side D21.

When the movable member 71 moves in an interlocking manner with the movement of the second cover member 104 in the closing direction, the roller 71*a* rolls from the base end portion to the terminal portion on the tilted surface 7*a*. By rolling from the base end portion to the terminal portion on the tilted surface 7*a*, the roller 71*a* pushes the tilted surface 7*a* toward the second side D22. By pushing the tilted surface 7*a* toward the second side D22, the roller 71*a* causes the heating unit 5*a* to move toward the second side D22 against a bias force of the bias member 72.

Neither the heating unit 5*a* nor the fixing unit 5*b* is fixed to the main body frame 1*x* by a fixture such as a screw.

The restriction portions 11 restrict a movement range of the fixing unit 5*b* toward the second side D22. By the rollers 71*a* causing the heating unit 5*a* to move toward the second side D22, the fixing unit 5*b* and the heating unit 5*a* are sandwiched by the movable member 71 and the restriction portions 11 (see FIG. 4 and FIG. 7).

FIG. 7 shows the interlocking mechanism 7 in a biased state where the movable member 71 is biasing the heating unit 5*a* and the fixing unit 5*b* toward the restriction portions 11. FIG. 4 and FIG. 7 each show the fixing device 5 in a vicinity state where the heating unit 5*a* is retained in the vicinity of the fixing unit 5*b* by the interlocking mechanism 7.

By being sandwiched between the movable member 71 and the restriction portions 11, the fixing unit 5*b* and the heating unit 5*a* are positioned in the second direction D2.

In other words, when the movable member 71 moves in an interlocking manner with the movement of the second cover member 104 in the closing direction, the fixing unit 5*b* and the heating unit 5*a* are sandwiched by the movable member 71 and the restriction portions 11 to thus be positioned in the second direction D2.

The first supporting member 54 includes a plurality of concave first fitting portions 542 that are opened toward the second side D22 (see FIG. 4 and FIG. 5). The second supporting member 55 includes a plurality of convex second fitting portions 553 into which the plurality of first fitting portions 542 can be fit, respectively (see FIG. 4 and FIG. 5).

By the interlocking mechanism 7 causing the heating unit 5*a* to move toward the second side D22, the plurality of first fitting portions 542 and the plurality of second fitting portions 553 fit into one another (see FIG. 4).

By the fitting of the plurality of first fitting portions 542 and the plurality of second fitting portions 553, relative movements of the heating unit 5*a* and the fixing unit 5*b* in the longitudinal direction D3 are restricted.

It is noted that alternatively, the second supporting member 55 may include the plurality of first fitting portions 542, and the first supporting member 54 may include the plurality of second fitting portions 553.

Meanwhile, when the movable member 71 moves in an interlocking manner with the movement of the second cover member 104 in the opening direction, the roller 71*a* rolls from the terminal portion to the base end portion on the tilted surface 7*a*, and the bias member 72 causes the heating unit 5*a* to move toward the first side D21.

FIG. 8 shows the interlocking mechanism 7 in a pulling state where the bias member 72 is pulling the heating unit 5*a* toward the first side D21. FIG. 5 and FIG. 8 each show the fixing device 5 in a spaced state where the heating unit 5*a* is spaced apart from the fixing unit 5*b* toward the first side D21 by the interlocking mechanism 7.

In the present embodiment, the movable member 71 further includes first contact surfaces 71*b* (see FIG. 7 to FIG. 9). The coupling member 56 further includes second contact surfaces 7*b* respectively corresponding to the first contact surfaces 71*b* and first concave portions 7*c* respectively corresponding to the rollers 71*a* (see FIG. 7 and FIG. 8).

The first contact surfaces 71*b* are surfaces that face the second side D22 and are capable of coming into contact with the second contact surfaces 7*b* of the coupling member 56. For example, the first contact surfaces 71*b* are formed at three or more positions in the movable member 71.

The second contact surfaces 7*b* are surfaces that face the first side D21 and are capable of coming into contact with the first contact surfaces 71*b* of the movable member 71. The second contact surfaces 7*b* are formed at positions respectively corresponding to the first contact surfaces 71*b* in the coupling member 56.

The first concave portions 7*c* face the first side D21 and are each arranged next to the terminal portion of the tilted surface 7*a* in the first direction D1 (see FIG. 7 and FIG. 8). The first concave portions 7*c* are provided at positions respectively corresponding to the rollers 71*a* in the coupling member 56. In the present embodiment, the first concave portions 7*c* are provided at two positions in the coupling member 56.

A part of the roller 71*a* can be inserted into the first concave portion 7*c*. Specifically, a part of the roller 71*a* including an edge on the second side D22 can be inserted into the first concave portion 7*c*.

When the movable member 71 moves in an interlocking manner with the movement of the second cover member 104 in the closing direction, the following first operation occurs. In the first operation, after the roller 71*a* rolls from the base end portion to the terminal portion on the tilted surface 7*a*, a part of the roller 71*a* enters the first concave portion 7*c*, and the first contact surface 71*b* is abutted against the second contact surface 7*b* (see FIG. 7).

By the first contact surfaces 71*b* being abutted against the second contact surfaces 7*b*, the fixing unit 5*b* and the heating unit 5*a* are sandwiched by the movable member 71 and the restriction portions 11. Thus, the fixing unit 5*b* and the heating unit 5*a* are positioned in the second direction D2.

In general, an allowance is formed between the roller 71*a* and a rotation shaft of the roller 71*a*. The fixing unit 5*b* and the heating unit 5*a* are positioned with high accuracy by being positioned in a state where the first contact surfaces 71*b* and the second contact surfaces 7*b* are in contact with one another.

Further, when the fixing unit 5*b* and the heating unit 5*a* are positioned by the contact of the first contact surfaces 71*b* and the second contact surfaces 7*b*, a large force is not applied to the rollers 71*a*. Therefore, durability of the rollers 71*a* is improved.

On the other hand, when the movable member 71 moves in an interlocking manner with the movement of the second cover member 104 in the opening direction, the following second operation occurs. In the second operation, after the rollers 71*a* are detached from the first concave portions 7*c* and the first contact surfaces 71*b* are spaced apart from the second contact surfaces 7*b*, the rollers 71*a* each roll from the terminal portion to the base end portion on the tilted surface 7*a* (see FIG. 8).

In the present embodiment, the coupling member 56 further includes third contact surfaces 7*d* respectively corresponding to the first contact surfaces 71*b* and second concave portions 7*e* respectively corresponding to the rollers 71*a* (see FIG. 7 and FIG. 8).

The third contact surfaces 7*d* are surfaces that face the first side D21 and are capable of coming into contact with the first contact surfaces 71*b* of the movable member 71. The third contact surfaces 7*d* are formed at positions respectively corresponding to the first contact surfaces 71*b* in the coupling member 56.

The second concave portions 7*e* face the first side D21 and are each arranged next to the base end portion of the tilted surface 7*a* in the first direction D1 (see FIG. 7 and FIG. 8). The second concave portions 7*e* are provided at positions respectively corresponding to the rollers 71*a* in the coupling member 56. In the present embodiment, the second concave portions 7*e* are provided at two positions in the coupling member 56.

A part of the roller 71*a* can be inserted into the second concave portion 7*e*. Specifically, a part of the roller 71*a* including an edge on the second side D22 can be inserted into the second concave portion 7*e*.

When the movable member 71 moves in an interlocking manner with the movement of the second cover member 104 in the opening direction, the following third operation occurs. In the third operation, after the roller 71*a* is detached from the first concave portion 7*c* and further rolls from the terminal portion to the base end portion on the tilted surface 7*a*, a part of the roller 71*a* enters the second concave portion 7*e*, and the first contact surface 71*b* is abutted against the third contact surface 7*d* (see FIG. 8).

Accordingly, when the heating unit 5*a* is spaced apart from the fixing unit 5*b* toward the first side D21, a force of the bias member 72 is not applied to the roller 71*a*. Therefore, durability of the rollers 71*a* is improved.

Meanwhile, when the movable member 71 moves in an interlocking manner with the movement of the second cover member 104 in the closing direction, the following fourth operation occurs. In the fourth operation, after the roller 71*a* is detached from the second concave portion 7*e* and the first contact surface 71*b* is spaced apart from the third contact surface 7*d*, the roller 71*a* rolls from the base end portion to the terminal portion on the tilted surface 7*a* (see FIG. 7).

In the image forming apparatus 10, the heating unit 5*a* can smoothly approach the fixing unit 5*b* or be spaced apart from the fixing unit 5*b* by actions of the rollers 71*a*.

In the present embodiment, the movable member 71 further includes rollers 71*f* (see FIG. 7). The rollers 71*f* are in contact with the guide member 70. When the movable member 71 moves along the first direction D1, the rollers 71*f* roll on a surface of the guide member 70.

By actions of the rollers 71*f*, the heating unit 5*a* can more smoothly approach the fixing unit 5*b* or be spaced apart from the fixing unit 5*b*.

Figure 6:
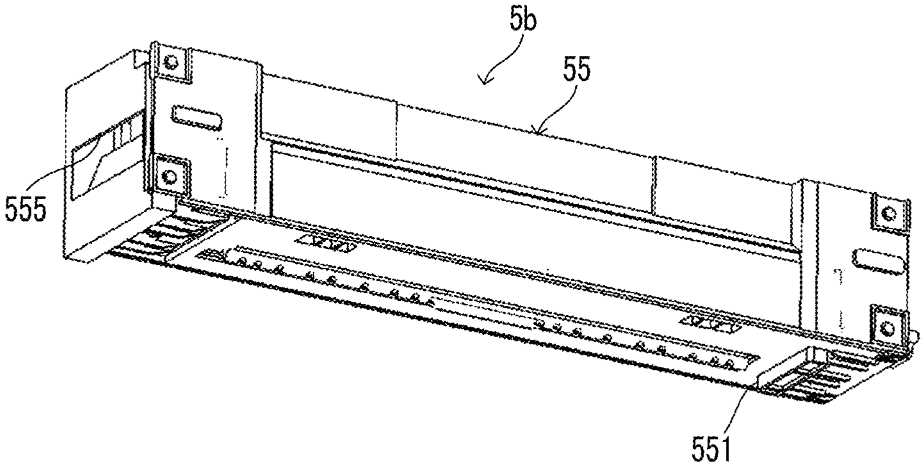
FIG. 6 is a perspective view of a fixing unit in the image forming apparatus according to the embodiment.

In addition, the image forming apparatus 10 further includes a first direction bias mechanism 8 that is attached to an inner surface of the second cover member 104 (see FIG. 7 and FIG. 8). Further, the second supporting member 55 of the fixing unit 5*b* includes protrusion portions 551 that protrude from a lower surface of the second supporting member 55 (see FIG. 4 to FIG. 6).

The first direction bias mechanism 8 includes a spring 80, a spring case 81, and a cap portion 82 (see FIG. 7).

The spring case 81 houses the spring 80. The cap portion 82 is attached while being movable with respect to the spring case 81. The spring 80 is an example of the elastic member.

When the second cover member 104 is positioned at the closing position, the spring 80 is sandwiched between the second cover member 104 and the second supporting member 55 of the fixing unit 5*b*. In the present embodiment, the spring 80 and the cap portion 82 are sandwiched between the second cover member 104 and the second supporting member 55.

By being sandwiched between the second cover member 104 and the second supporting member 55, the spring 80 biases the second supporting member 55 in an attachment direction D12 by the elastic force (see FIG. 7). The attachment direction D12 is a direction opposite to a drawing direction D11 of the fixing unit 5*b*.

Furthermore, by the force that the second supporting member 55 receives from the spring 80 when the second cover member 104 is positioned at the closing position, the protrusion portions 551 are abutted against the lower supporting portions 12.

By the actions of the spring 80 and the protrusion portions 551, the fixing unit 5*b* is positioned in the first direction D1. It is noted that the first direction bias mechanism 8 may alternatively be attached to the second supporting member 55 of the fixing unit 5*b*.

[Switch 50]

The image forming apparatus 10 includes a switch 50 which switches a state according to an operation with respect to the first cover member 103 (see FIG. 7 and FIG. 8).

By opening of the first cover member 103, the switch 50 electrically turns off a power feed line to the heater 51 of the heating unit Sa. On the other hand, by closing of the first cover member 103, the switch 50 electrically turns on the power feed line.

The first cover member 103 is opened for opening a part of the sheet conveying path 30. In the present embodiment, the first cover member 103 is opened to thus open the third conveying path 30*c* (see FIG. 1). The switch 50 is provided as a safety device that is used when the first cover member 103 is opened.

[Configuration of Latch/Release Mechanism 6]

As described above, the latch/release mechanism 6 includes the latch mechanism 6*x* and the release mechanism 6*y*. The latch mechanism 6*x* latches the second cover member 104 at the closing position (see FIG. 7 and FIG. 11).

Figure 10:
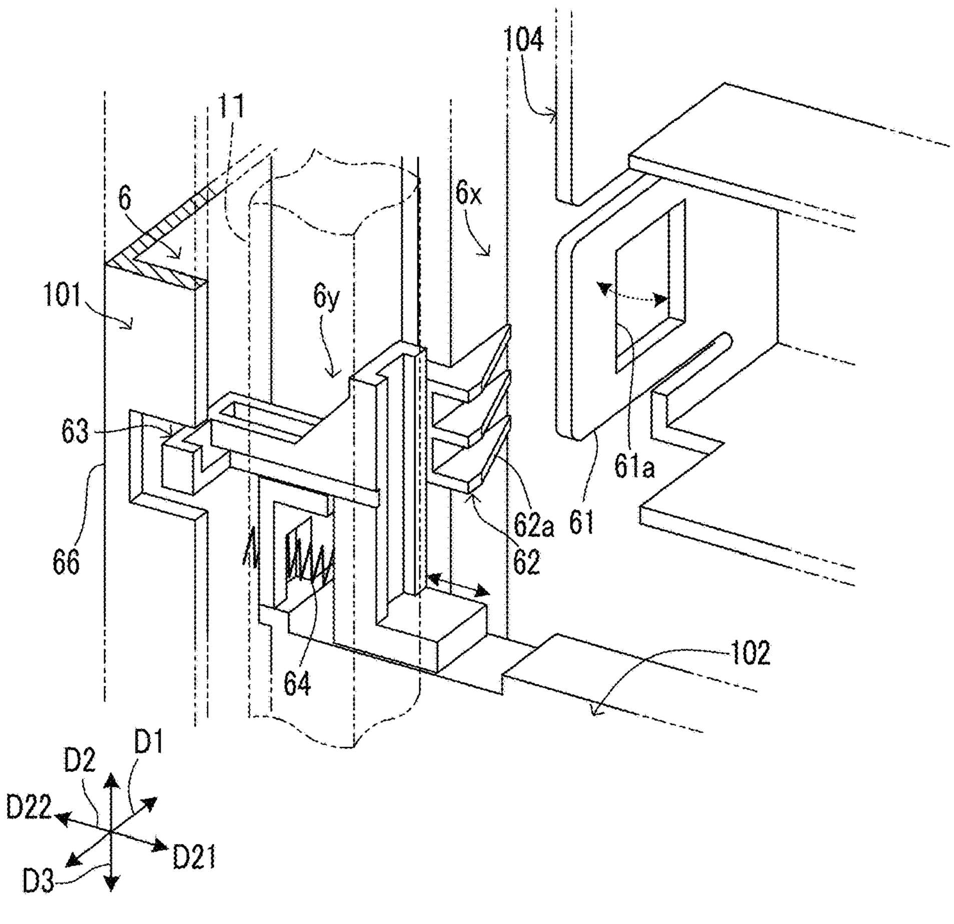
FIG. 10 is a perspective view of the latch/release mechanism in the released state in the image forming apparatus according to the embodiment.

The release mechanism 6*y* releases the latch of the second cover member 104 by the latch mechanism 6*x* upon receiving an external force (see FIG. 8 and FIG. 10).

The release mechanism 6*y* is arranged at a position that can be accessed from the first opening 101 in the main body 1 (see FIG. 8). In other words, the release mechanism 6*y* can be accessed from outside the main body 1 only when the first cover member 103 is opened.

In the present embodiment, the release mechanism 6*y* can be accessed only when the power feed line to the heater 51 is electrically turned off by the switch 50.

In the present embodiment, the latch mechanism 6*x* includes an elastic latch portion 61 and an engagement portion 62 (see FIG. 7 to FIG. 11).

The elastic latch portion 61 can be elastically deformed from a latching shape for latching the second cover member 104 to a releasing shape for releasing the latch of the second cover member 104.

In the present embodiment, the elastic latch portion 61 is formed in the second cover member 104. The elastic latch portion 61 is of a plate shape that protrudes toward the inner side of the main body 1 from the second cover member 104 (see FIG. 7 and FIG. 9). The elastic latch portion 61 is formed with an opening 61*a* (see FIG. 9).

The engagement portion 62 engages with the elastic latch portion 61 by being inserted into the opening 61*a* of the elastic latch portion 61. In the present embodiment, the engagement portion 62 is provided at an edge portion of the second opening 102 in the main body 1 (see FIG. 7, FIG. 8, FIG. 10, and FIG. 11).

For example, as shown in FIG. 10, the engagement portion 62 includes tilted surfaces 62*a* that are tilted from the edge of the second opening 102 toward the inner side in the direction from the outer side toward the inner side of the main body 1. The elastic latch portion 61 and the engagement portion 62 constitute a so-called snap-fit.

When closing the second cover member 104, a tip end portion of the elastic latch portion 61 slides on the tilted surfaces 62*a* so that the elastic latch portion 61 is elastically deformed toward the inner side of the opening 61*a*. In addition, when the tip end portion of the elastic latch portion 61 passes beyond the engagement portion 62 toward the inner side of the second opening 102, the engagement portion 62 is inserted into the opening 61*a* of the elastic latch portion 61 (see FIG. 7 and FIG. 11).

The image forming apparatus 10 further includes a guide portion 65 which is provided at one or both of the edge portion of the second opening 102 in the main body 1 and the edge portion of the second cover member 104 (see FIG. 7 to FIG. 9).

When closing the second cover member 104, the guide portion 65 guides the second cover member 104 to a latching position at which the second cover member 104 is latched by the latch mechanism 6*x*. The latching position is also the closing position at which the second opening 102 is closed.

For example, the guide portion 65 protrudes from the edge portion of the second opening 102 in the main body 1. In this case, a top surface of the guide portion 65 is a surface that is tilted toward the inner side of the second opening 102 in the direction from the outer side of the main body 1 to the inner side.

Further, the guide portion 65 may also protrude from the edge portion of the second cover member 104. In this case, the top surface of the guide portion 65 is a surface that is tilted toward the inner side of the second cover member 104 in the direction from the outer surface side of the second cover member 104 toward the inner surface side.

When the second cover member 104 is opened, the second cover member 104 may be positionally deviated in the up-down direction or the lateral direction due to an allowance of the mechanism that supports the second cover member 104, or the like. When the second cover member 104 is closed, the guide portion 65 corrects the positional deviation of the second cover member 104.

For example, the guide portion 65 includes a lower guide portion 65*a* that is formed at a lower edge portion of the second opening 102 in the main body 1 or a lower edge portion of the second cover member 104 (see FIG. 8). In the example shown in FIG. 8, the lower guide portion 65*a* is formed to protrude from the lower edge portion of the second opening 102 in the main body 1.

In the present embodiment, the guide portion 65 further includes an upper guide portion 65*b* that is formed at an upper edge portion of the second opening 102 in the main body 1 or an upper edge portion of the second cover member 104 (see FIG. 9). In the example shown in FIG. 9, the upper guide portion 65*b* is formed to protrude from the upper edge portion of the second cover member 104.

Figure 11:
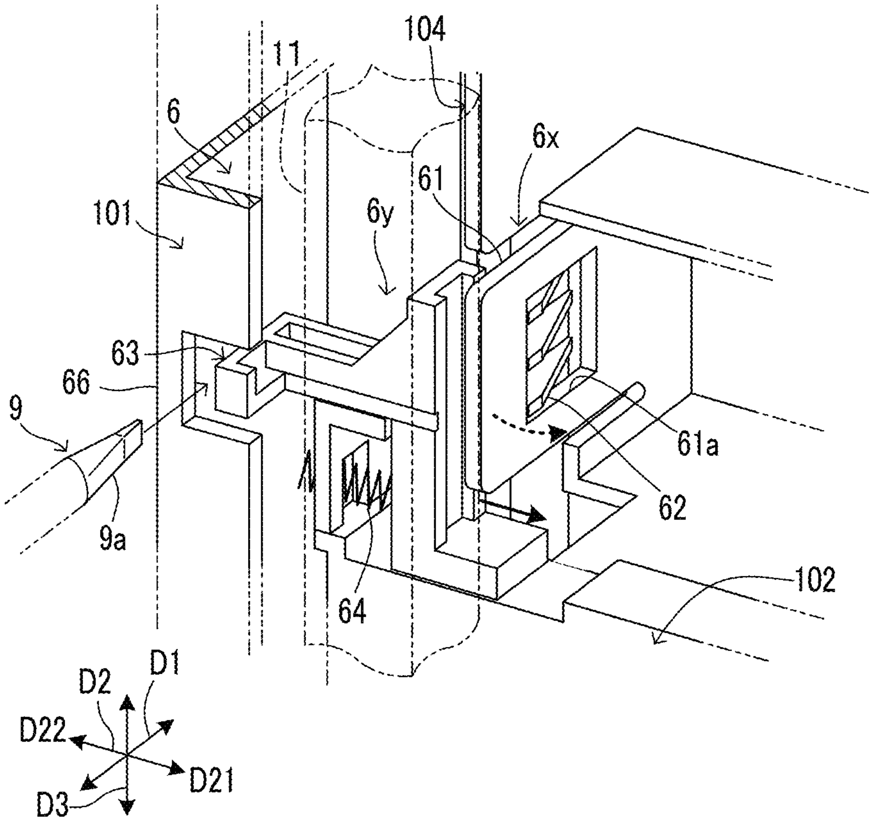
FIG. 11 is a perspective view of the latch/release mechanism in the latched state in the image forming apparatus according to the embodiment.

The release mechanism 6*y* includes a movable member 63 and an elastic bias member 64 (see FIG. 7 to FIG. 11). The movable member 63 moves from a first position to a second position upon receiving an external force. FIG. 7, FIG. 10, and FIG. 11 each show a state where the movable member 63 is positioned at the first position. FIG. 8 shows a state where the movable member 63 is positioned at the second position.

In the present embodiment, the second position is a position on the first side D21 of the second direction D2 with respect to the first position. In the present embodiment, the restriction portion 11 is abutted against a part of the movable member 63 so as to restrict the movement of the movable member 63 toward the first side D21 beyond the second position.

The elastic bias member 64 elastically biases the movable member 63 from the second position side toward the first position. In the present embodiment, the elastic bias member 64 is a tension spring that biases the movable member 63 from the second position side toward the first position.

It is noted that a compression spring, a leaf spring, or the like may be adopted as the elastic bias member 64.

Upon receiving a force that is directed from the second side D22 toward the first side D21 in the second direction D2, the movable member 63 moves from the first position to the second position against a bias force of the elastic bias member 64. When moving from the first position to the second position, the movable member 63 is abutted against the elastic latch portion 61.

By biasing the elastic latch portion 61 when the movable member 63 moves from the first position to the second position, the movable member 63 causes the elastic latch portion 61 to be deformed from the latching shape to the releasing shape. In FIG. 7, the movable member 63 that has moved to the second position and the elastic latch portion 61 that has been deformed to the releasing shape are indicated by virtual lines (dash-dot-dot lines).

By the elastic latch portion 61 being deformed from the latching shape to the releasing shape by the bias force of the movable member 63, the engagement portion 62 comes off from the opening 61*a* of the elastic latch portion 61, and thus the latch of the second cover member 104 by the latch mechanism 6*x* is released.

In the present embodiment, when the latch of the second cover member 104 by the latch mechanism 6*x* is released, the first direction bias mechanism 8 causes the second cover member 104 to move from the closing position to the opening position side by the force of the spring 80 (see FIG. 10).

In the present embodiment, by performing an operation of opening the second cover member 104 and an operation of moving the movable member 63, the latch of the second cover member 104 by the latch mechanism 6*x* is released. Thus, it is possible to prevent the user from carelessly drawing out the fixing unit 5*b* from the main body 1.

The image forming apparatus 10 further includes an access limitation portion 66 (see FIG. 10 and FIG. 11). The access limitation portion 66 limits a size of an access path from the first opening 101 to a region on an opposite side of the second position side with respect to the movable member 63 in the main body 1.

Specifically, the access limitation portion 66 limits the access path to a size in which a finger cannot be inserted. The access limitation portion 66 forms the access path such that a tip end portion 9*a* of a stick-like portion in a tool 9 such as a screwdriver can be inserted (see FIG. 7, FIG. 8, and FIG. 11).

By rotating the tool 9 in a state where the tip end portion 9*a* of the tool 9 is inserted into the access path, the tool 9 transmits a force to the movable member 63 as a lever that uses the access limitation portion 66 as a fulcrum and the tip end portion 9*a* as a load (see FIG. 8).

The access limitation portion 66 prevents the user from carelessly operating the movable member 63 with a finger.

[Modified Example]

In the image forming apparatus 10, the entire fixing device 5 may be capable of being drawn out from the main body 1 via the second opening 102.

In the image forming apparatus 10, the elastic latch portion 61 may be arranged at the edge portion of the second opening 102 in the main body 1. In this case, the engagement portion 62 is formed at the edge portion of the second cover member 104.

[Notes of Disclosure]

Hereinafter, a general outline of the invention extracted from the embodiment described above will be noted. It is noted that the respective configurations and processing functions described in the notes below can be sorted and arbitrarily combined as appropriate.

<Note 1>

An image forming apparatus, including:

a main body including a first opening and a second opening formed in a direction different from that of the first opening;

a sheet conveying path which is arranged in the main body and passes through a specific position inside the first opening;

a first cover member which is capable of opening and closing the first opening and is opened to thus open a part of the sheet conveying path;

a second cover member which is capable of opening and closing the second opening;

a fixing device which is arranged at the specific position in the main body, includes a heater and a fixing member which is heated by the heater and also heats a toner image formed on a sheet that passes through the specific position, and at least a part of which can be drawn out from the main body via the second opening;

a latch mechanism which latches the second cover member at a closing position; and a release mechanism which is arranged at a position that can be accessed from the first opening in the main body and releases the latch of the second cover member by the latch mechanism upon receiving an external force.

<Note 2>

The image forming apparatus according to note 1, including a switch which electrically turns off a power feed line to the heater by opening of the first cover member and electrically turns on the power feed line by closing of the first cover member.

<Note 3>

The image forming apparatus according to note 1 or 2, in which the latch mechanism includes an elastic latch portion which can be elastically deformed from a latching shape for latching the second cover member to a releasing shape for releasing the latch of the second cover member, and the release mechanism includes a movable member which biases the elastic latch portion when moving from a first position to a second position upon receiving an external force, to thus cause the elastic latch portion to be deformed from the latching shape to the releasing shape.

<Note 4>

The image forming apparatus according to note 3, including an elastic bias member which elastically biases the movable member from a side of a second position toward a first position.

<Note 5>

The image forming apparatus according to note 3 or 4, including an access limitation portion which limits a size of an access path from the first opening to a region on an opposite side of a side of a second position with respect to the movable member in the main body.

<Note 6>

The image forming apparatus according to any one of notes 1 to 5, including a guide portion which is provided at one or both of an edge portion of the second opening in the main body and an edge portion of the second cover member, and guides, when closing the second cover member, the second cover member to a latching position at which the second cover member is latched by the latch mechanism.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a main body including a first opening and a second opening formed in a direction different from that of the first opening;

a sheet conveying path which is arranged in the main body and passes through a specific position inside the first opening;

a first cover member which is capable of opening and closing the first opening and is opened to thus open a part of the sheet conveying path;

a second cover member which is capable of opening and closing the second opening;

a fixing device which is arranged at the specific position in the main body, includes a heater and a fixing member which is heated by the heater and also heats a toner image formed on a sheet that passes through the specific position, and at least a part of which can be drawn out from the main body via the second opening;

a restriction portion which is arranged in the main body and restricts a movement toward the first opening of the fixing device;

a latch mechanism which latches the second cover member at a closing position;

a release mechanism which is arranged at a position that can be accessed from the first opening in the main body and releases the latch of the second cover member by the latch mechanism upon receiving an external force; and an access limitation portion which protrudes toward the restriction portion at an edge of the first opening, wherein the latch mechanism includes an elastic latch portion which can be elastically deformed from a latching shape for latching the second cover member to a releasing shape for releasing the latch of the second cover member, the release mechanism includes a movable member which is arranged in a region more apart from the first opening than a region between the restriction portion and the access limitation portion, and biases the elastic latch portion when the movable member moves from a first position to a second position upon receiving the external force, the second position being more apart from the first opening than the first position, to thus cause the elastic latch portion to be deformed from the latching shape to the releasing shape, the restriction portion restricts the movement of the movable member toward an opposite side of a side of the first position from the second position, and the access limitation portion limits a size of an access path from the first opening to a region on an opposite side of a side of the second position with respect to the movable member in the main body.

2. The image forming apparatus according to claim 1, comprising:

a switch which electrically turns off a power feed line to the heater by opening of the first cover member and electrically turns on the power feed line by closing of the first cover member.

3. The image forming apparatus according to claim 1, comprising:

an elastic bias member which elastically biases the movable member from a side of the second position toward the first position.

4. The image forming apparatus according to claim 1, comprising:

a guide portion which is provided at one or both of an edge portion of the second opening in the main body and an edge portion of the second cover member, and guides, when closing the second cover member, the second cover member to a latching position at which the second cover member is latched by the latch mechanism.

5. The image forming apparatus according to claim 1, wherein when a tool is rotated in a state where a protruding portion of the tool is inserted into a region of the access path between the restriction portion and the access limitation portion to transmit a force toward the second position to the movable member as a lever that uses a tip end portion of the protruding portion as a load, the access limitation portion is a fulcrum of the lever.

* * * * *